US009863698B1

(12) United States Patent
Turner

(10) Patent No.: US 9,863,698 B1
(45) Date of Patent: Jan. 9, 2018

(54) HEATED AIR MOVING DEVICE

(71) Applicant: Bradley Turner, Lansing, KS (US)

(72) Inventor: Bradley Turner, Lansing, KS (US)

( * ) Notice: Subject to any disclaimer, the term of this patent is extended or adjusted under 35 U.S.C. 154(b) by 0 days.

(21) Appl. No.: 15/278,220

(22) Filed: Sep. 28, 2016

(51) Int. Cl.
| | | |
|---|---|---|
| F26B 3/04 | (2006.01) | |
| F04D 17/16 | (2006.01) | |
| F04D 29/42 | (2006.01) | |
| F04D 29/58 | (2006.01) | |
| F04D 27/00 | (2006.01) | |
| F04D 25/08 | (2006.01) | |
| F04D 25/06 | (2006.01) | |
| F26B 9/00 | (2006.01) | |
| F26B 21/10 | (2006.01) | |
| F26B 21/12 | (2006.01) | |
| F26B 21/00 | (2006.01) | |

(52) U.S. Cl.
CPC ............... *F26B 3/04* (2013.01); *F04D 17/16* (2013.01); *F04D 25/06* (2013.01); *F04D 25/08* (2013.01); *F04D 27/004* (2013.01); *F04D 29/4226* (2013.01); *F04D 29/582* (2013.01); *F26B 9/003* (2013.01); *F26B 21/004* (2013.01); *F26B 21/10* (2013.01); *F26B 21/12* (2013.01)

(58) Field of Classification Search
CPC .......... F26B 3/04; F26B 9/003; F26B 21/004; F26B 21/10; F26B 21/12; F04D 17/16; F04D 25/06; F04D 25/08; F04D 27/004; F04D 29/4226; F04D 29/582
USPC ....................................................... 34/89, 90
See application file for complete search history.

(56) References Cited

U.S. PATENT DOCUMENTS

| | | | | |
|---|---|---|---|---|
| 3,286,368 | A * | 11/1966 | Thomas | A47L 11/32 |
| | | | | 15/339 |
| D269,116 | S * | 5/1983 | Armbruster | D23/328 |
| 5,155,924 | A * | 10/1992 | Smith | E04B 1/7092 |
| | | | | 15/405 |
| 5,174,048 | A * | 12/1992 | Shero | F26B 21/001 |
| | | | | 34/444 |
| 5,265,895 | A | 11/1993 | Barrett | |
| 5,992,039 | A * | 11/1999 | Bunch | D06F 58/02 |
| | | | | 34/602 |
| 6,202,322 | B1 * | 3/2001 | Turner, IV | F26B 21/001 |
| | | | | 34/618 |
| 6,739,070 | B1 * | 5/2004 | Jacobs | F26B 21/001 |
| | | | | 34/554 |

(Continued)

FOREIGN PATENT DOCUMENTS

| | | | | |
|---|---|---|---|---|
| EP | 1724902 A1 * | 11/2006 | | F21S 9/022 |
| EP | 1837591 A1 * | 9/2007 | | F21S 9/022 |

*Primary Examiner* — Stephen M Gravini

(57) ABSTRACT

A heated air moving device for drying wet surfaces and materials includes a housing. A controller, a first power module and plurality of sockets are coupled to the housing. The first power module is operationally coupled to the controller. The sockets are operationally coupled to the first power module and are configured to couple electrically powered equipment to the first power module. An intake is positioned in a respective opposing side of the housing. A nozzle, fluidically coupled to the internal space, is coupled to the housing. A fan and a heater are coupled to the housing and is positioned in an internal space defined by the housing. The fan is configured to draw air through the intake and expel the air through the nozzle. The heater is configured to heat the air such that air expelled from the housing dries an area proximate to the housing.

20 Claims, 5 Drawing Sheets

(56) References Cited

U.S. PATENT DOCUMENTS

| | | | |
|---|---|---|---|
| 7,007,403 B1 * | 3/2006 | Studebaker | E04B 1/7092 34/90 |
| D596,283 S * | 7/2009 | Martinez | D23/383 |
| 7,703,777 B2 | 4/2010 | Horn, Jr. | |
| 7,785,064 B2 * | 8/2010 | Bartholmey | F04D 25/084 415/1 |
| D634,414 S | 3/2011 | Wolfe et al. | |
| D698,433 S | 1/2014 | Tomasiak et al. | |
| 8,789,291 B2 * | 7/2014 | Reets | F26B 21/002 34/618 |
| 9,052,141 B2 * | 6/2015 | Andrisin, III | F26B 21/001 |
| 9,121,638 B2 * | 9/2015 | Black | F26B 21/004 |
| 2007/0002562 A1 | 1/2007 | VanWambeke et al. | |
| 2012/0227280 A1 | 9/2012 | Hopkins et al. | |
| 2013/0280108 A1 | 10/2013 | Bearup et al. | |

\* cited by examiner

HEATED AIR MOVING DEVICE

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIE THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION (1) Field of the Invention (2) Description of Related Art Including Information Disclosed Under 37 CFR 1.97 and 1.98

The disclosure and prior art relates to air moving devices and more particularly pertains to a new air moving device for drying wet surfaces and materials.

BRIEF SUMMARY OF THE INVENTION

An embodiment of the disclosure meets the needs presented above by generally comprising a housing. A controller, a first power module and plurality of sockets are coupled to the housing. The first power module is operationally coupled to the controller. The sockets are operationally coupled to the first power module and are configured to couple electrically powered equipment to the first power module. An intake is positioned in a respective opposing side of the housing. A nozzle, fluidically coupled to the internal space, is coupled to the housing. A fan and a heater are coupled to the housing and is positioned in an internal space defined by the housing. The fan is configured to draw air through the intake and expel the air through the nozzle. The heater is configured to heat the air such that air expelled from the housing dries an area proximate to the housing.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
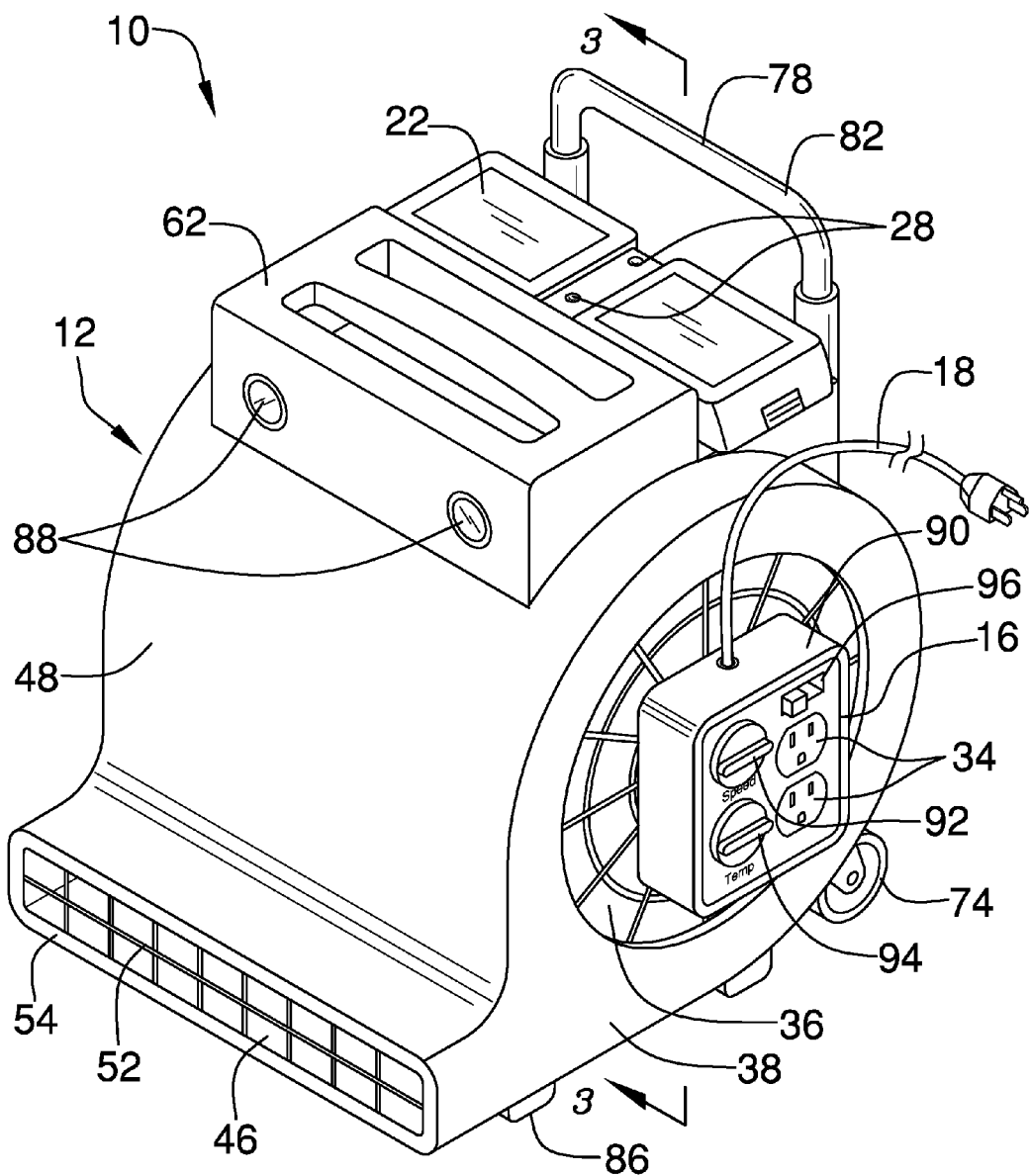
FIG. 1 is an isometric perspective view of a heated air moving device according to an embodiment of the disclosure.
Figure 2:
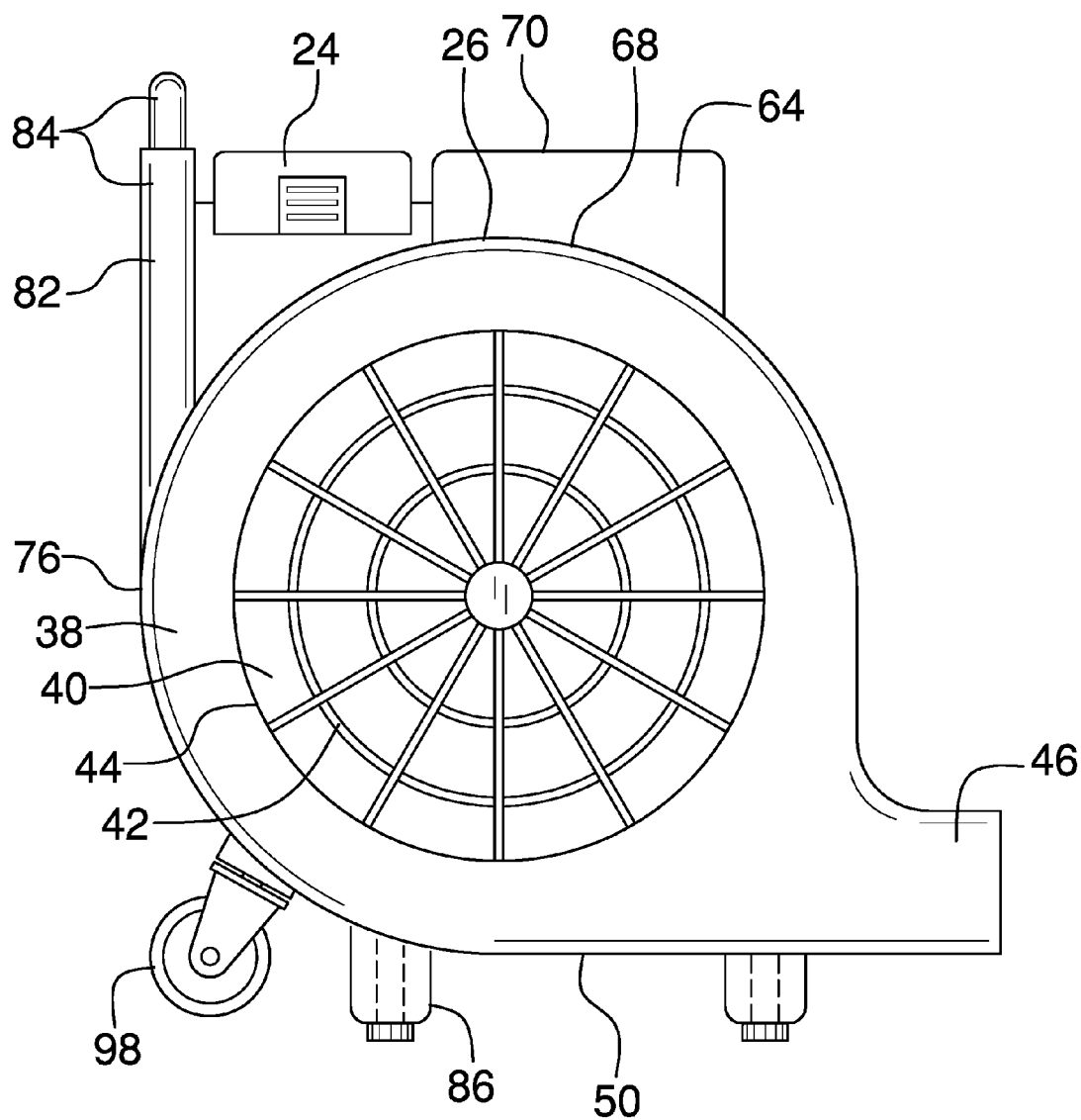
FIG. 2 is a side view of an embodiment of the disclosure.
Figure 3:
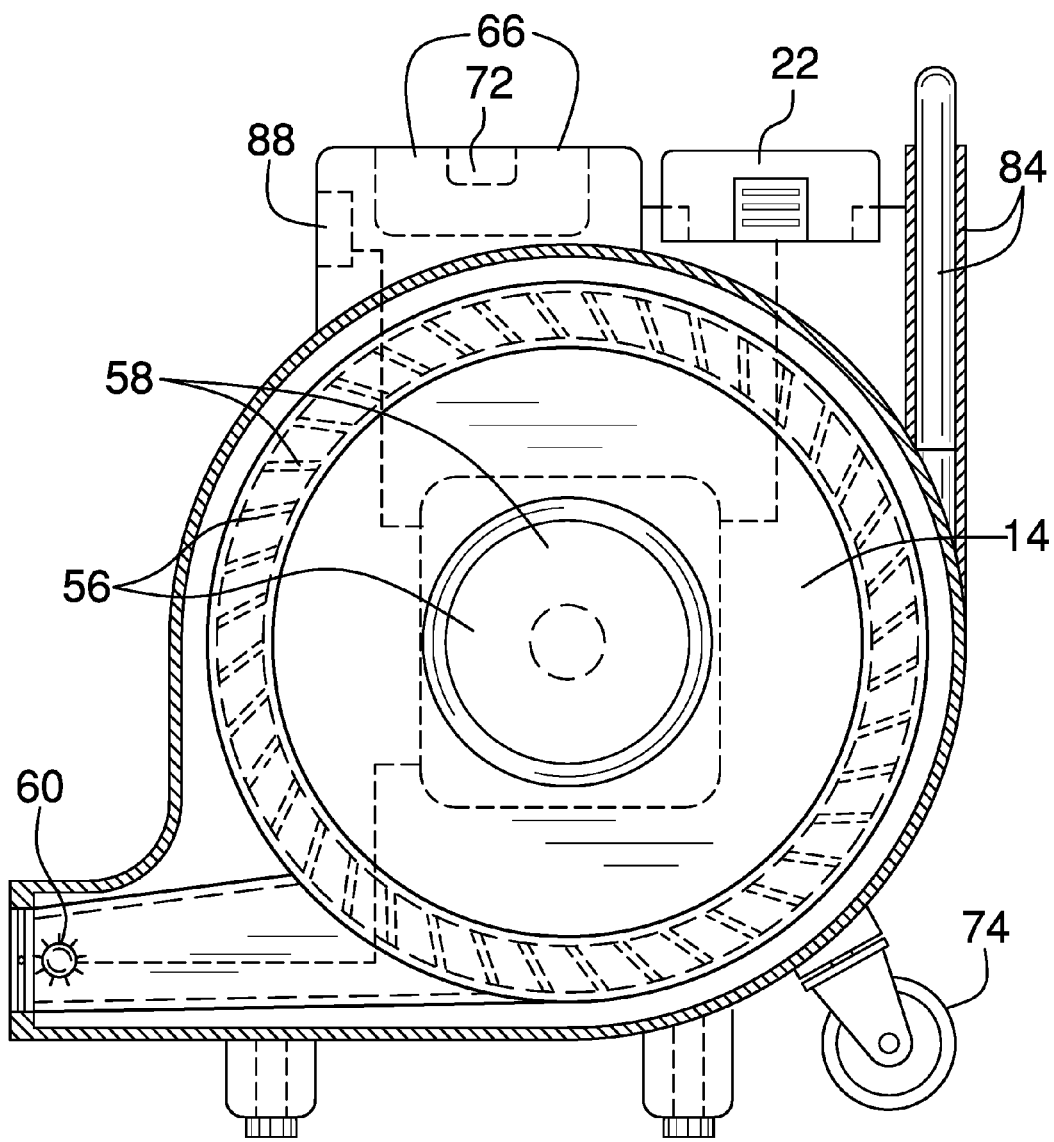
FIG. 3 is a cross-sectional view of an embodiment of the disclosure.
Figure 4:
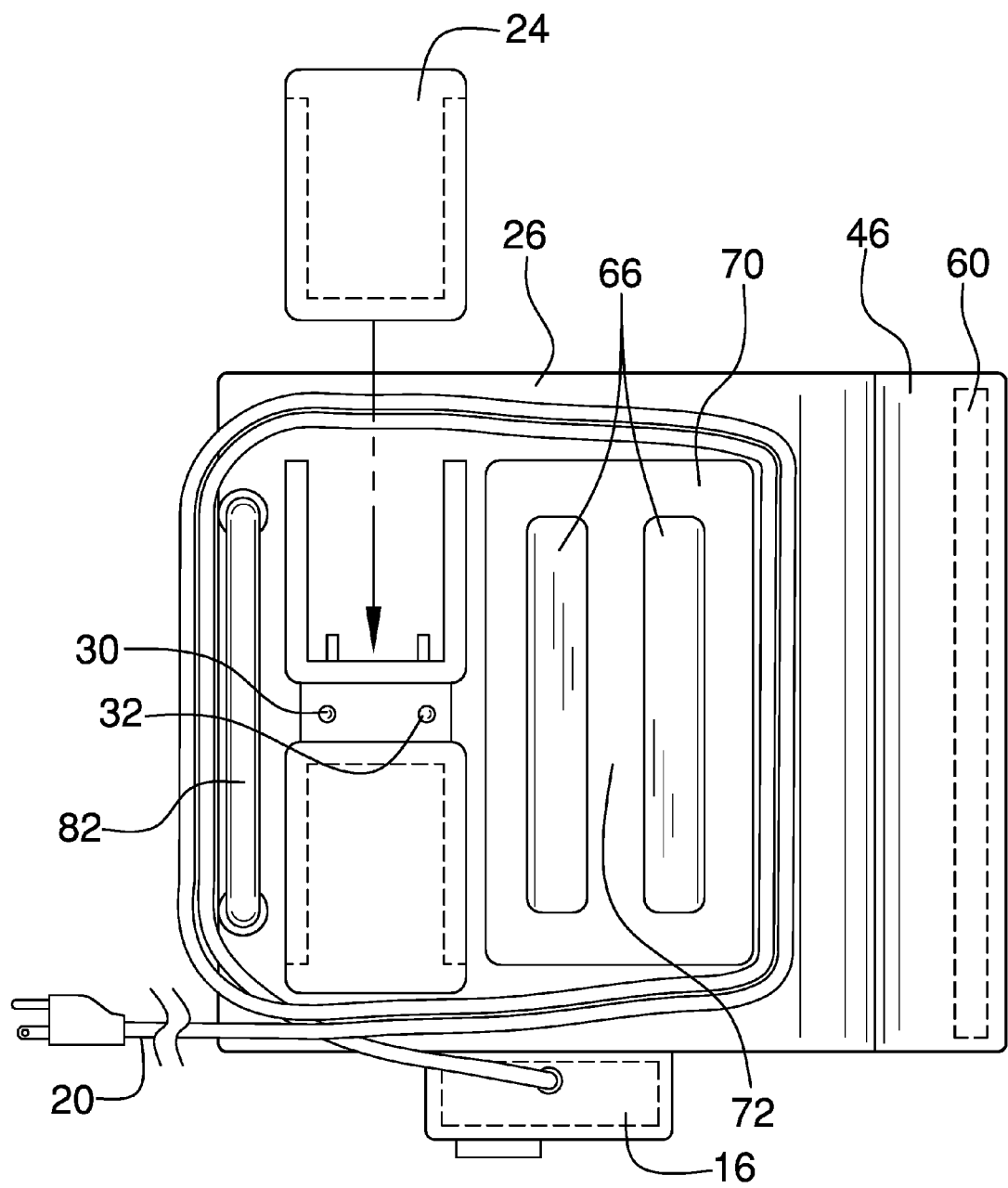
FIG. 4 is a top view of an embodiment of the disclosure.
Figure 5:
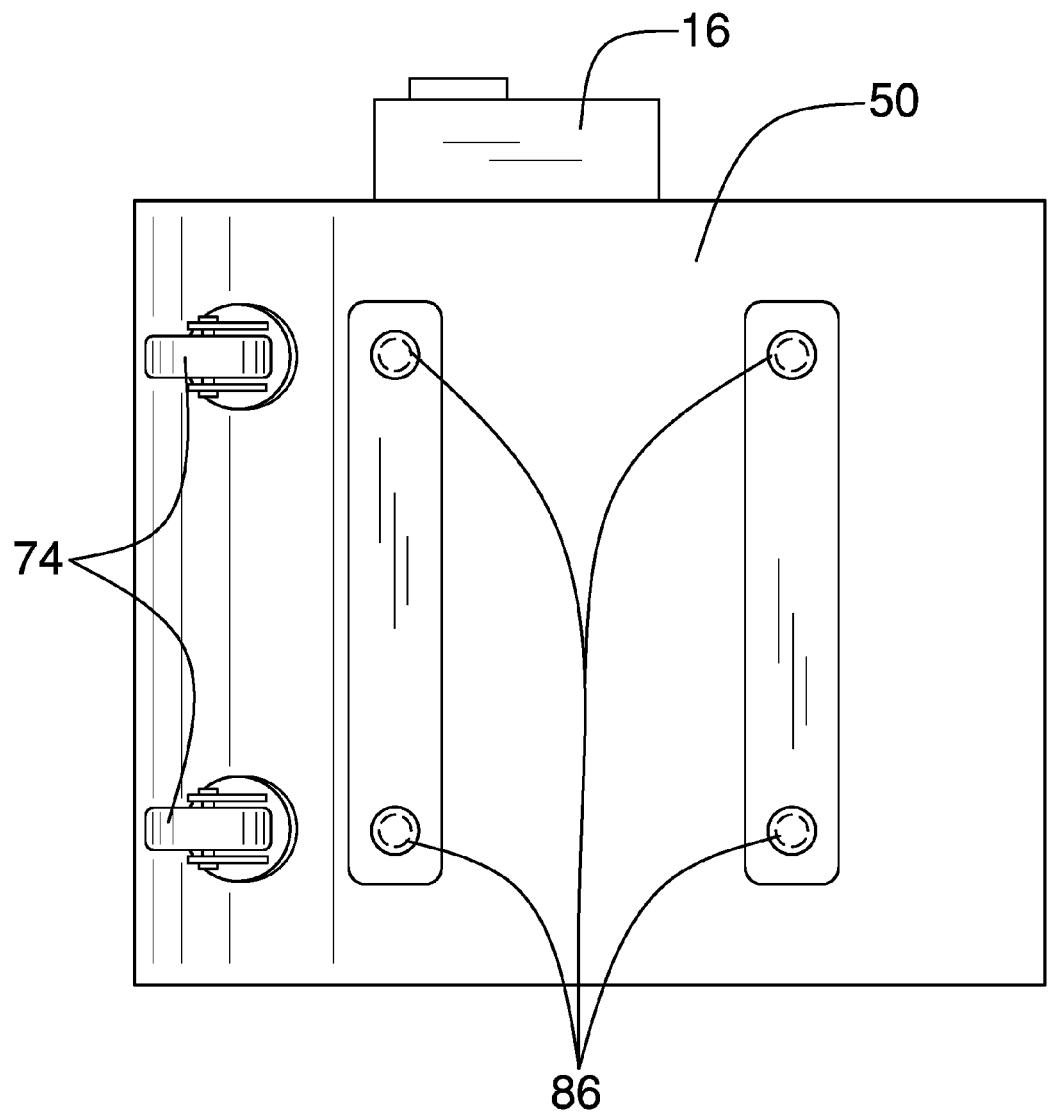
FIG. 5 is a bottom view of an embodiment of the disclosure.

With reference now to the drawings, and in particular to FIGS. 1 through 5 thereof, a new air moving device embodying the principles and concepts of an embodiment of the disclosure and generally designated by the reference numeral 10 will be described.

As best illustrated in FIGS. 1 through 5, the heated air moving device 10 generally comprises a housing 12 that defines an internal space 14. In one embodiment, the housing 12 is substantially cylindrically shaped. A controller 16 and a first power module 18 are coupled to the housing 12. The first power module 18 is operationally coupled to the controller 16. In one embodiment, the first power module 18 comprises a power cord 20. The power cord 20 is configured to couple to a source of alternating current. In another embodiment, a second power module 22 is coupled to the housing 12. In yet another embodiment, the second power module 22 comprises at least one rechargeable battery 24. In still yet another embodiment, the second power module 22 is reversibly couplable to a top 26 of the housing 12.

An indicator 28 is coupled to the housing 12 proximate to the second power module 22. The indicator 28 is operationally coupled to the second power module 22. The indicator 28 is positioned to display the charge state of the second power module 22. In one embodiment, the indicator 28 comprises a red light emitting diode 30 and a green light emitting diode 32. The red light emitting diode 30 is illuminated when the second power module 22 requires recharging. The green light emitting diode 32 is illuminated when the second power module 22 retains charge.

A plurality of sockets 34 is coupled to the housing 12 and is operationally coupled to the first power module 18 and the second power module 22. The sockets 34 are configured to couple electrically powered equipment to the first power module 18 and the second power module 22. In one embodiment, the plurality of sockets 34 comprises two sockets 34.

An intake 36 is positioned in a respective opposing side 38 of the housing 12. The intake 36 is configured to admit air into the internal space 14. In one embodiment, the intake 36 comprises a penetration 40 and a first grate 42. The first grate 42 is coupled to a perimeter 44 of the penetration 40 such that the first grate 42 covers the penetration 40.

A nozzle 46 is coupled to the housing 12. The nozzle 46 is fluidically coupled to the internal space 14. The nozzle 46 extends from a front 48 of the housing 12 proximate to a bottom 50 of the housing 12. The nozzle 46 extends between the opposing sides 38 of the housing 12. A second grate 52 is coupled to a circumference 54 of the nozzle 46. The second grate 52 covers the nozzle 46.

A fan 56 is coupled to the housing 12 and is positioned in the internal space 14. The fan 56 is positioned in the housing 12 such that the fan 56 is configured to draw air through the intake 36 and expel the air through the nozzle 46. In one embodiment, the fan 56 comprises a centrifugal blower 58.

A heater 60 is coupled to the housing 12 and is positioned in the internal space 14. The heater 60 is positioned in the internal space 14 such that the heater 60 is configured to heat the air passing through the internal space 14. In one embodiment, the heater 60 is positioned in the nozzle 46.

In one embodiment, a first handle 62 is coupled to the top 26 of the housing 12. The first handle 62 comprises a shell 64 and a pair of slots 66. The shell 64 is substantially rectangularly box shaped. The shell 64 has a lower face 68 that is complementary to the top 26 of the housing 12. The slots 66 are positioned through an upper face 70 of the shell 64 and defines a grab 72. The slots 66 are positioned in the shell 64 such that the grab 72 is configured to be grasped in a hand of a user such that the housing 12 is liftable.

In another embodiment, a pair of rollers 74 is coupled to the bottom 50 of the housing 12 proximate to a back 76 of the housing 12. The rollers 74 are positioned singly proximate to the opposing sides 38 of the housing 12. In this embodiment, a second handle 78 is coupled to the back 76 of the housing 12. The second handle 78 comprises a pair of tubes 80 and a crossbar 82. The tubes 80 are coupled singly proximate to the opposing sides 38 of the housing 12. The crossbar 82 is coupled to and extends between the tubes 80 distal from the housing 12. Each tube 80 comprises a plurality of nested sections 84 such that the tubes 80 are extendable. The second handle 78 is configured to be grasped in the hand of the user such that the housing 12 is rollable upon the rollers 74. In yet another embodiment, the rollers 74 comprise wheels.

A plurality of legs 86 is coupled to the bottom 50 of the housing 12. The legs 86 are screwedly adjustable. The legs 86 are positioned on the housing 12 such that the legs 86 are configured to be vertically adjusted to stabilize the housing 12. In one embodiment, the plurality of legs 86 comprises four legs 86 that are rectangularly positioned on the bottom 50.

A plurality of lights 88 is coupled to the housing 12. The lights 88 are operationally coupled to the controller 16. The lights 88 are positioned on the housing 12 such that the lights 88 are configured to illuminate an area proximate to the housing 12. In one embodiment, the lights 88 are positioned on the first handle 62 such that light emitted by the lights 88 illuminates an area adjacent to the front 48 of the housing 12. In another embodiment, the plurality of lights 88 comprises two lights 88.

In one embodiment, the controller 16 comprises a box 90 that is coupled to the first grate 42. The box 90 is substantially centrally positioned on the first grate 42. A speed dial 92 is coupled to the box 90 and operationally coupled to the fan 56. The speed dial 92 is positioned to control the rotational speed of the fan 56. A temperature dial 94 is coupled to the box 90 and operationally coupled to the heater 60. The temperature dial 94 is positioned to adjust the power supplied to the heater 60. An on/off switch 96 is coupled to the box 90 and operationally coupled to the first power module 18 and the second power module 22. The on/off switch 96 is positioned to selectively couple the first power module 18 and the second power module 22 to the fan 56, the heater 60, the sockets 34 and the lights 88. In another embodiment, the plurality of sockets 34 is coupled to and extends into the box 90.

In use, the fan 56 is positioned in the housing 12 such that the fan 56 is configured to draw air through the intake 36 and expel the air through the nozzle 46. The heater 60 is positioned in the internal space 14 such that the heater 60 is configured to heat the air passing through the internal space 14. The air expelled from the housing 12 dries an area proximate to the housing 12.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A heated air moving device comprising:
   a housing defining an internal space;
   a controller coupled to said housing,
   a first power module coupled to said housing, said first power module being operationally coupled to said controller;
   a plurality of sockets coupled to said housing and operationally coupled to said first power module, said sockets being configured for coupling of electrically powered equipment to said first power module;
   an intake positioned in a respective opposing side of said housing, said intake being configured to admit air into said internal space;
   a nozzle coupled to said housing, said nozzle being fluidically coupled to said internal space;
   a fan coupled to said housing and positioned in said internal space;
   a heater coupled to said housing and positioned in said internal space; and
   wherein said fan is positioned in said housing such that said fan is configured to draw air through said intake and expel the air through said nozzle, wherein said heater is positioned in said internal space such that said heater is configured to heat the air passing through said internal space, such that the air expelled from said housing dries an area proximate to said housing.

2. The device of claim 1, further including said housing being substantially cylindrically shaped.

3. The device of claim 1, further including said first power module comprising a power cord, said power cord being configured for coupling to a source of alternating current.

4. The device of claim 3, further including a second power module coupled to said housing, said second power module comprising at least one rechargeable battery.

5. The device of claim 4, further including said second power module being reversibly couplable to a top of said housing.

6. The device of claim 4, further including an indicator coupled to said housing proximate to said second power module, said indicator being operationally coupled to said second power module, wherein said indicator is positioned on said housing such that said indicator is positioned to display a charge state of said second power module.

7. The device of claim 6, further including said indicator comprising a red light emitting diode and a green light emitting diode, such that said red light emitting diode is illuminated when said second power module requires recharging and wherein said green light emitting diode is illuminated when said second power module retains charge.

8. The device of claim 4, further including said plurality of sockets being operationally coupled to said second power module.

9. The device of claim 1, further including said plurality of sockets comprising two said sockets.

10. The device of claim 4, further including said intake comprising a penetration and a first grate, said first grate being coupled to a perimeter of said penetration such that said first grate covers said penetration.

11. The device of claim 1, further including said nozzle extending from a front of said housing proximate to a bottom of said housing, said nozzle extending between said opposing sides of said housing.

12. The device of claim 1, further including a second grate coupled to a circumference of said nozzle, such that said second grate covers said nozzle.

13. The device of claim 1, further including said fan comprising a centrifugal blower.

14. The device of claim 1, further including said heater being positioned in said nozzle.

15. The device of claim 1, further including a first handle coupled to said top of said housing, said first handle comprising a shell and a pair of slots, said shell being substantially rectangularly box shaped, said shell having a lower face complementary to said top of said housing, said slots being positioned through an upper face of said shell defining a grab, wherein said slots are positioned in said shell such that said grab is configured for grasping in a hand of a user such that said housing is liftable.

16. The device of claim 1, further comprising:
a pair of rollers coupled to said bottom of said housing proximate to a back of said housing, said rollers being positioned singly proximate to said opposing sides of said housing, said rollers comprising wheels; a second handle coupled to said back of said housing, said second handle
comprising a pair of tubes and a crossbar, said tubes being coupled singly proximate to said opposing sides of said housing, said crossbar being coupled to and extending between said tubes distal from said housing, each said tube comprising a plurality of nested sections such that said tubes are extendable; and
wherein said second handle is positioned on said housing such that said second handle is configured for grasping in a hand of a user, wherein said housing is rollable upon said rollers.

17. The device of claim 1, further including a plurality of legs coupled to said bottom of said housing, said legs being screwedly adjustable, wherein said legs are positioned on said housing such that said legs are configured for adjustment to stabilize said housing; said plurality of legs comprising four said legs rectangularly positioned on said bottom.

18. The device of claim 10, further including a plurality of lights coupled to said housing, said lights being operationally coupled to said controller, wherein said lights are positioned on said housing such that said lights are configured to illuminate an area proximate to said housing, said lights being positioned on said first handle such that light emitted by said lights illuminated an area adjacent to said front of said housing, said plurality of lights comprising two said lights.

19. The device of claim 18, further including said controller comprising: a box coupled to said first grate, said box being substantially centrally positioned on said first grate;
a speed dial coupled to said box and operationally coupled to said fan, wherein said speed dial is positioned to control the rotational speed of said fan; a temperature dial coupled to said box and operationally coupled to said heater,
wherein said temperature dial is positioned to adjust the power supplied to said heater;
an On/Off switch coupled to said box and operationally coupled to said first
power module and said second power module, wherein said On/Off switch is positioned for selectively coupling said first power module and a second power module to said fan, said heater, said sockets and said lights; and
said plurality of sockets being coupled to and extending into said box.

20. A heated air moving device comprising:
a housing defining an internal space, said housing being substantially cylindrically shaped;
a controller coupled to said housing;
a first power module coupled to said housing, said first power module being operationally coupled to said controller, said first power module comprising a power cord, said power cord being configured for coupling to a source of alternating current;
a second power module coupled to said housing, said second power module
comprising at least one rechargeable battery, said second power module being reversibly couplable to a top of said housing;
an indicator coupled to said housing proximate to said second power module, said indicator being operationally coupled to said second power module, wherein said indicator is positioned on said housing such that said indicator is positioned to display a charge state of said second power module, said indicator comprising a red light emitting diode and a green light emitting diode, such that said red light emitting diode is illuminated when said second power module requires recharging and wherein said green light emitting diode is illuminated when said second power module retains charge;
a plurality of sockets coupled to said housing and operationally coupled to said first power module and said second power module, said sockets being configured for coupling of electrically powered equipment to said first power module and said second power module, said plurality of sockets comprising two said sockets;

an intake positioned in a respective opposing side of said housing, said intake being configured to admit air into said internal space, said intake comprising a penetration and a first grate, said first grate being coupled to a perimeter of said penetration such that said first grate covers said penetration;

a nozzle coupled to said housing, said nozzle being fluidically coupled to said internal space, said nozzle extending from a front of said housing proximate to a bottom of said housing, said nozzle extending between said opposing sides of said housing;

a second grate coupled to a circumference of said nozzle, such that said second grate covers said nozzle;

a fan coupled to said housing and positioned in said internal space, wherein said fan is positioned in said housing such that said fan is configured to draw air through said intake and expel the air through said nozzle, said fan comprising a centrifugal blower;

a heater coupled to said housing and positioned in said internal space, wherein said heater is positioned in said internal space such that said heater is configured to heat the air passing through said internal space, said heater being positioned in said nozzle;

a first handle coupled to said top of said housing, said first handle comprising a shell and a pair of slots, said shell being substantially rectangularly box shaped, said shell having a lower face complementary to said top of said housing, said slots being positioned through an upper face of said shell defining a grab, wherein said slots are positioned in said shell such that said grab is configured for grasping in a hand of a user such that said housing is liftable;

a pair of rollers coupled to said bottom of said housing proximate to a back of said housing, said rollers being positioned singly proximate to said opposing sides of said housing, said rollers comprising wheels;

a second handle coupled to said back of said housing, said second handle
comprising a pair of tubes and a crossbar, said tubes being coupled singly proximate to said opposing sides of said housing, said crossbar being coupled to and extending between said tubes distal from said housing,
each said tube comprising a plurality of nested sections such that said tubes are extendable, wherein said second handle is positioned on said housing such that said second handle is configured for grasping in the hand of the user, wherein said housing is rollable upon said rollers;

a plurality of legs coupled to said bottom of said housing, said legs being screwedly adjustable, wherein said legs are positioned on said housing such that said legs are configured for adjustment to stabilize said housing; said plurality of legs comprising four said legs rectangularly positioned on said bottom;

a plurality of lights coupled to said housing, said lights being operationally coupled to said controller, wherein said lights are positioned on said housing such that said lights are configured to illuminate an area proximate to said housing, said lights being positioned on said first handle such that light emitted by said lights illuminated an area adjacent to said front of said housing, said plurality of lights comprising two said lights; said controller comprising:

a box coupled to said first grate, said box being substantially centrally positioned on said first grate, a speed dial coupled to said box and operationally coupled to said fan, wherein said speed dial is positioned to control the rotational speed of said fan, a temperature dial coupled to said box and operationally coupled to said heater, wherein said temperature dial is positioned to adjust the power supplied to said heater, an On/Off switch coupled to said box and operationally coupled to said first power module and said second power module, wherein said On/Off switch is positioned for selectively coupling said first power module and said second power module to said fan, said heater, said sockets and said lights, and said plurality of sockets being coupled to and extending into said box; and wherein said fan is positioned in said housing such that said fan is configured to draw air through said intake and expel the air through said nozzle, wherein said heater is positioned in said internal space such that said heater is configured to heat the air passing through said internal space, such that the air expelled from said housing dries an area proximate to said housing.

* * * * *